United States Patent [19]
Freese et al.

[11] Patent Number: 5,353,111
[45] Date of Patent: Oct. 4, 1994

[54] NOISE RESISTANT LASER SYSTEM FOR MACHINE ALIGNMENT

[75] Inventors: James W. Freese, Canton; Charles D. Stout, Ann Arbor, both of Mich.

[73] Assignee: Intra Corporation, Westland, Mich.

[21] Appl. No.: 38,928

[22] Filed: Mar. 29, 1993

[51] Int. Cl.⁵ .................. G01B 11/26; G01C 1/00
[52] U.S. Cl. .................. 356/152.1; 356/153; 250/214 B
[58] Field of Search .............. 356/141, 152, 153; 250/214 B

[56] References Cited

U.S. PATENT DOCUMENTS

| | | |
|---|---|---|
| 3,551,057 | 12/1970 | Hamilton et al. |
| 4,518,253 | 5/1985 | Takahashi ............................. 356/4 |
| 4,712,953 | 12/1987 | Witzel et al. ........................ 356/153 |
| 4,732,471 | 3/1988 | Cain et al. ........................... 356/152 |
| 4,981,354 | 1/1991 | DeHainaut et al. ................. 356/141 |
| 4,987,293 | 1/1991 | Baciak ................................. 356/141 |
| 5,148,232 | 9/1992 | Duey et al. ......................... 356/152 |

*Primary Examiner*—Stephen C. Buczinski
*Attorney, Agent, or Firm*—Alex Rhodes

[57] ABSTRACT

A noise resistant laser system for machine alignment comprised of a semiconductor laser for producing a narrow collimated beam; a photodetector target for receiving the beam and producing four trains of output pulses which are indicative of the horizontal and vertical displacements of the laser beam from the center of the target; a crystal controlled oscillator for generating pulses at a frequency which is distinguishable from the frequencies of noise generated by industrial power supplies, industrial lighting and their harmonics; a closed loop control circuit for pulsing the laser at the distinguishable frequency; and a sample and hold circuit for sorting out components due to the beam displacement and suppressing components due to the industrial power supplies, industrial lighting and their harmonics. The closed loop control circuit is comprised of an interrupter, a feedback control circuit and a laser current control circuit. The interruper and the feedback control circuit are controlled by the crystal controlled oscillator. The feedback control circuit is responsive to the emission level of the laser to maintain a constant average emmision level. A display unit processes output signals from X/Y amplifiers at the output of the sample and hold circuit to enable an operator to perform a machine alignment.

17 Claims, 3 Drawing Sheets

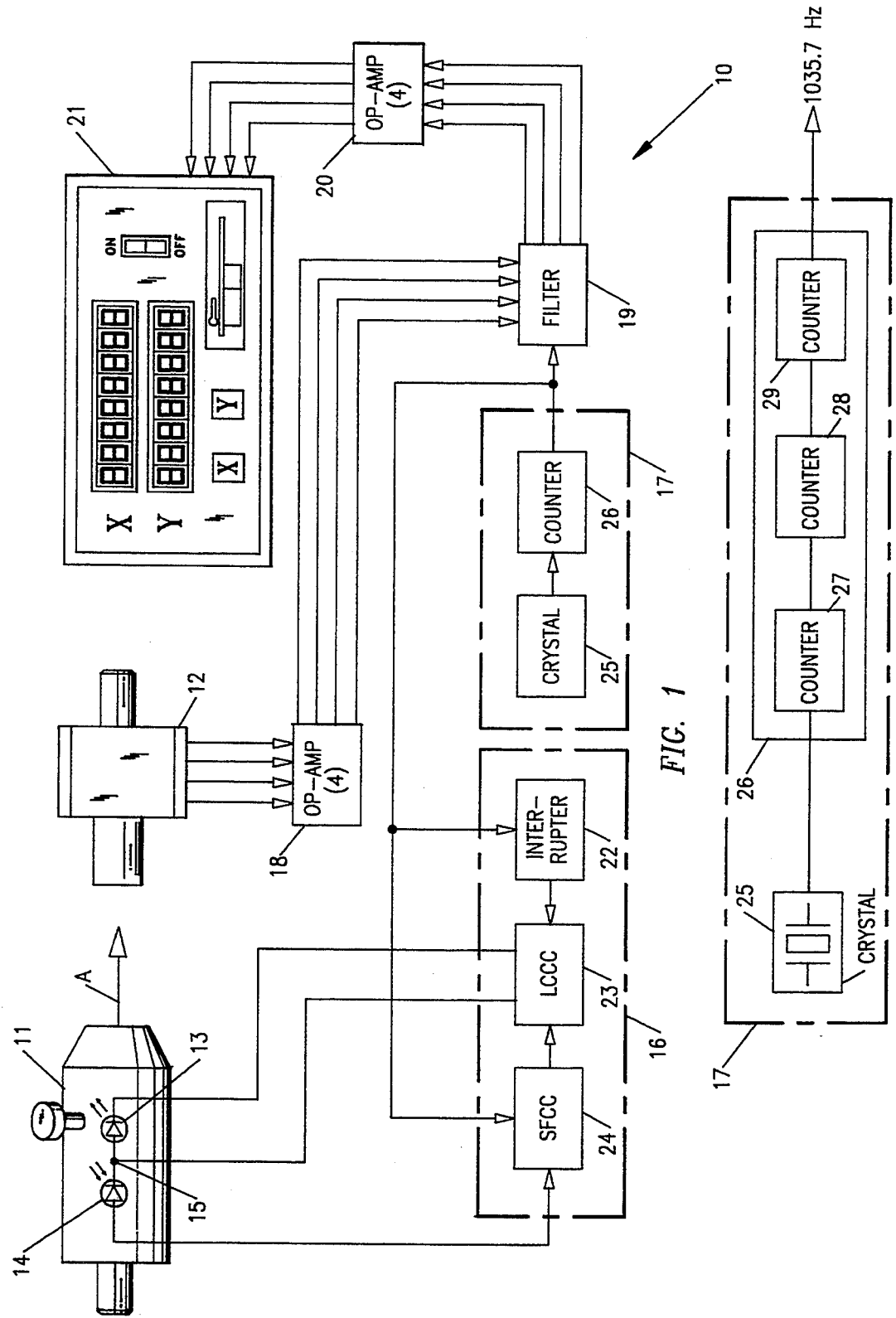

NOISE RESISTANT LASER SYSTEM FOR MACHINE ALIGNMENT

BACKGROUND OF THE INVENTION

The invention relates to machine alignment, and more particularly, to a noise resistant laser system for aligning machines. The invention is also intended to be used for routine machine inspection in manufacturing.

Many industrial processes mandate that accurate spatial relationships be maintained between machine elements. Accurate machine alignment is essential for maintaining quality in manufacturing. Improperly machined parts increase manufacturing costs and adversely affect customer goodwill. Misalignment of machine elements can also result in broken tools and lost production.

Until recently, equipment for machine alignment consisted primarily of dial indicators, levels, feeler gauges, stretched piano wires, telescopes and the like. This type of equipment is still used by some manufacturers.

Some manufacturing requires levels of precision that cannot be readily obtained with mechanical, electromechanical and optical alignment equipment. For example, highly automated manufacturing requires very precise spatial and angular orientation of tools relative to one another and relative to workpieces. Improper alignment in multiple station machines results in high reject rates and tool breakage. Even a short down time for a highly automated transfer line can be extremely expensive.

The need for increased precision and for minimizing machine down time has made laser alignment systems a desirable alternative in many companies. Alignment systems employing lasers and photodetector targets were introduced about thirty years ago. A typical laser alignment system consists of a laser emitter, at least one photodetector target that produces electrical output signals capable of identifying the locations at which the target is impinged, and an output device for processing the target output signals and displaying the results.

In a typical application, a laser emitter and a photodetector target are attached to a machine with special adapters at predetermined locations and machine components are adjusted to align the machine.

By way of example, Duey et al. U.S. Pat. No. 5,148,232 issued on Sep. 15, 1992, discloses an apparatus and method for aligning a crankpin grinding machine. The apparatus consists of a laser emitter for projecting a narrow collimated beam of light, a photodetector target which produces an output which is indicative of the position of the laser beam on the target, special adapters to mount the laser and target on the crankpin grinding machine, and an input/output unit to process the output of the target and display information to an operator.

The alignment system reduces time and cost for aligning a crankpin grinding machine and provides the opportunity of performing regularly scheduled maintenance during machine idle time rather than "as needed".

One problem with existing laser machine alignment systems is that their performance is affected by ambient light. This problem exists because laser machine alignment systems utilize low power semiconductor lasers because of space limitations and worker safety. The low power lasers result in low signal to noise ratios which cause fluctuations in display unit readouts. The fluctuations in the readouts are annoying and limit the degree of accuracy of readings on the display units.

In some laser systems, targets have optical filters for blocking out light waves of higher frequencies than the laser frequency. By way of example, in the QUADRA-BEAM TM infrared laser alignment system, manufactured by the Intra Corporation of Westland, Mich., an optical filter with a cutoff wave length above the infrared region is used to block out visible light from sources such as industrial sodium vapor, mercury vapor and fluorescent lights.

Although the QUADRA-BEAM TM filter provides some improvement, it is not totally effective in reducing ambient light noise. The frequency of this noise has been determined to be harmonically related to the natural frequency of a power line which varies from country to country.

One possible solution to the ambient light noise problem is to increase the signal to noise ratio by increasing laser power. However, this is not desirable because it would expose workers to higher levels of radiation and increase the probability of eye and nervous system injuries.

SUMMARY OF THE INVENTION

The present invention solves the ambient noise problem by pulsing the laser emitter at a frequency which is neither a multiple of 50 Hz, 60 Hz nor their harmonics, electronically processing the output of the photodetector target and suppressing the 50 Hz and 60 Hz components and their harmonics.

The invention resides in the electronics used for suppressing the 50 Hz and 60 Hz and harmonic noise and in the combination of the noise suppressive system with a laser machine alignment system. A system has been built and tested and found to be a significant improvement over existing laser machine alignment systems.

One benefit of the invention is that fluctuations in display unit readouts are eliminated. Another benefit in addition to the foregoing benefit is that greater accuracy can be provided in display unit readouts because of the elimination of fluctuations in the readouts.

The present invention is comprised of: a semiconductor laser emitter for projecting a narrow collimated laser beam; a means for pulsing the laser beam at $F \neq nf$, where "F" is the pulsing frequency, "f" is 50 Hz or 60 Hz, and "n"=1,2,3, ... ; a lateral effect or quadrant detector type target for receiving the laser beam and producing four output signals which are indicative of the position of the laser beam on the target; a crystal controlled oscillator for generating the pulsing frequency; a filter for suppressing the 50 Hz and 60 Hz and harmonic components of the target output signals, said filter being responsive to said crystal controlled oscillator; and a display unit for processing the target output signals after suppressing the 50 Hz, 60 Hz and their harmonics to enable an operator to perform a machine alignment.

The foregoing and other objects and advantages of the invention will become more apparent from the following detailed description of a preferred embodiment, where reference is made to the accompanying drawings forming a part thereof.

BRIEF DESCRIPTION OF THE DRAWINGS

FIG. 1 is a block diagram of a noise resistant laser machine alignment system according to the present invention.

FIG. 2 is an block diagram of the crystal controlled oscillator of FIG. 1.

DESCRIPTION OF THE PREFERRED EMBODIMENT

Figure 3:
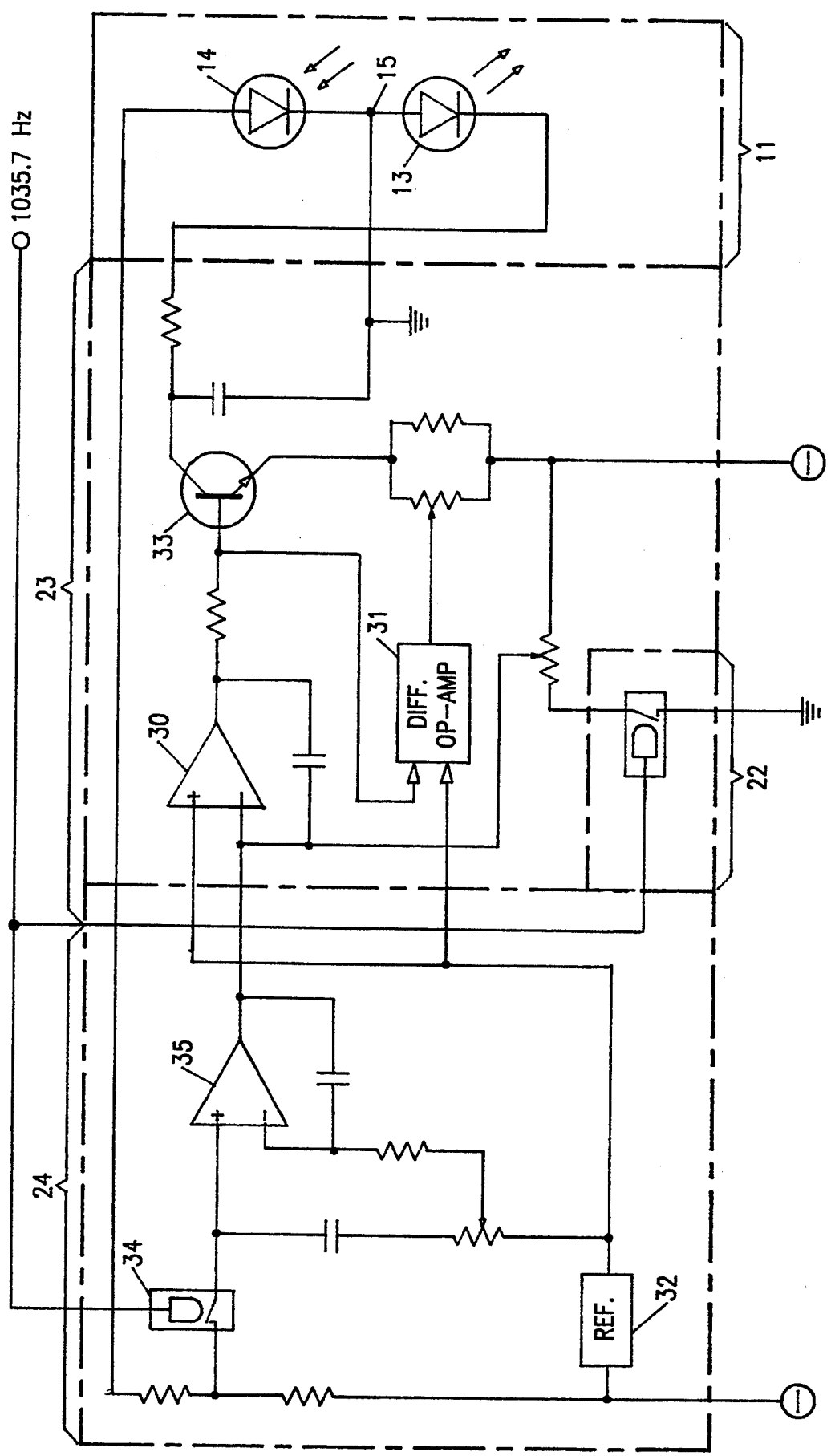
FIG. 3 is an electrical schematic diagram of the laser and the laser power supply of FIG. 1 which are controlled by the crystal oscillator of FIG. 2.

With reference to FIG. 1, a block diagram is shown of the noise resistant laser system for machine alignment which is generally designated by the numeral 10.

The laser aligning system 10 includes a laser emitter 11 for projecting a highly collimated coherent beam of light radiation onto a photodetector target 12. The frequency of the laser is preferably within the visible light range for rough adjustment of the laser relative to the target and vice versa. For safety and health considerations the laser is preferably a low power, semiconductor laser utilizing a laser emitting diode (LED) 13. As shown in FIG. 1, the laser emitter 11 also has a light sensitive diode 14 which senses the energy level of the LED 13. Numeral 15 designates the point of connection of the diodes 13 and 14.

In a typical application, the laser emitter 11 and the target 12 are mounted on a machine with special adapters (not shown) at stations to be aligned and machine components are adjusted to align the stations.

The target 12 is preferably a lateral effect photodiode or quadrant type detector. A suitable lateral effect photodiode for a lateral effect detector is the PIN-Spot/2D photodiode marketed by United Detector Technology ("UDT"), Hawthorne, Calif. It consists of four discrete elements on a single substrate. When a light beam is centered on the cell, equal output currents from each element indicate centering or nulling. As the beam moves away from the center, a current imbalance occurs indicating an off center position of the laser beam. These targets are well suited to detect positioning relative to two axes. UDT SC series photodetectors are also suitable as continuous dual axis position sensors that provide both X and Y axis position information. The above described UDT photodetectors provide a position resolution of better than 0.0005 inches.

Although the laser emitter 11 and the target 12 are components of the QUADRA-BEAM laser system manufactured by the Intra Corporation of Westland, Mich., it is not intended to limit the scope of the invention to the Intra system.

With reference to FIG. 1, a laser power supply 16 pulses the laser beam at a frequency which is neither a multiple of 50 Hz, 60 Hz nor their harmonics, i.e. $F \neq nf$, where "F" is the laser pulsing frequency, "f" is 50 Hz or 60 Hz, and "n"=1,2,3, .... A crystal controlled oscillator 17 generates a train of pulses at the pulsing frequency "F". A beam "A" impinges upon the target 12 and produces four output currents "B" corresponding to the position of the beam "A" on the target 12. Conditioning amplifiers 18 convert the four pulsed current outputs "B" from the target 12 into voltages and serve as line drivers necessary to drive the long cables between the amplifiers 18 and the filter 19.

The four voltage outputs of the conditioning amplifiers 18 are fed to an analog switch based filter 19 which suppresses the 50 Hz and 60 Hz components and harmonic components. The filter 19 is controlled by the oscillator 17. The DC components of the output of the filter 19, due to the laser beam, are fed into four X, Y gain control amplifiers 20. The output voltages of the amplifiers 20 are the inputs of a display unit 21 wherein the analog voltages are digitized and processed to display the X, Y displacements of the beam "A" from the center of the target 12. Step-by-step instructions are also displayed to guide an operator through the alignment process.

The power supply 16 is composed of an interrupter 22, a laser current control circuit 23, and a synchronous feedback control circuit 24. The oscillator 17 is conventional and is comprised of a crystal stabilized active RC circuit 25 and a multistage counter 26 which functions as a frequency divider. The blocks 16, 17 and 19 will be more fully described in FIGS. 3, 2 and 4.

Referring particularly to FIG. 2, the output of the crystal stabilized circuit 25 of oscillator 17 is connected to the input of counter 26.

Counter 26 is used to pulse (to interrupt) the laser beam "A" at the chosen pulse frequency. This frequency is used to distinguish the laser beam "A" from ambient light noise caused by industrial light and power sources. The noise is understood to be harmonically related to the 50 Hz or 60 Hz line frequency. As previously stated, the chosen pulse frequency "F" does not coincide with 50 Hz, 60 Hz and their harmonics. The frequency of 1035.7 Hz was selected as the pulse frequency for the laser emitter 11. It is obtained from a crystal stabilized active RC circuit 25 having an original frequency of 3.574545 MHz and the counter 26. Counter 26 comprises three 74HCT169 ICs 27, 28 and 29 as a divider. The 3.574545 MHz frequency is used for deriving the 1035.7 Hz frequency with digital electronics.

Referring now to FIG. 3, the pulsed laser power supply 16 is comprised of the interrupter 22, the laser current control circuit 23 and the synchronous feedback control circuit 24.

The interrupter 22 uses a 1H5145 high-level CMOS analog switch manufactured by General Electric's Intersil Company. Interrupter 22 receives 1035.7 Hz pulses from counter 26 and has its output connected to the inverting input of an operational amplifier 30 of laser current control circuit 23.

The laser current control circuit 23 is connected across the LED 13 and controls the energy emitted by the LED 13. The circuit 23 is comprised of an operational amplifier 30, a differential amplifier 31, a reference circuit 32 and an output transistor 33. Operational amplifier 30 is fed from synchronous feedback control circuit 24 and reference circuit 32. The pulsing frequency 1035.7 Hz is also fed to op amp 30. Differential amplifier 31 compares the amplitude of amplifier 30 1035.7 Hz output with the reference. Two amplifiers 30 and 31 feed output transistor 33 to govern the average level of the 1035.7 Hz pulsing LED 13. Circuit 23 forms a closed loop power level control circuit with LED 13, light sensitive diode 14, and synchronous feedback control circuit 24.

The feedback control circuit 24 is comprised of reference circuit 32, an analog switch 34 of the same 1H5145 type, and an operational amplifier 35. Circuit 24 is responsive to a feedback voltage produced by a current flowing through light sensitive diode 14 that perceives the light flux emitted by LED 13. In switch 34 this feedback voltage is pulsed by the 1035.7 Hz pulse train supplied by the divider 26. The train has the opposite phase as compared with that fed to interrupter 22. The switch 34 voltage output is compared in op amp 35 with the reference voltage produced by reference circuit 32, and the output of op amp 35 is connected to op amp 30 in laser current control circuit 23.

Figure 4:
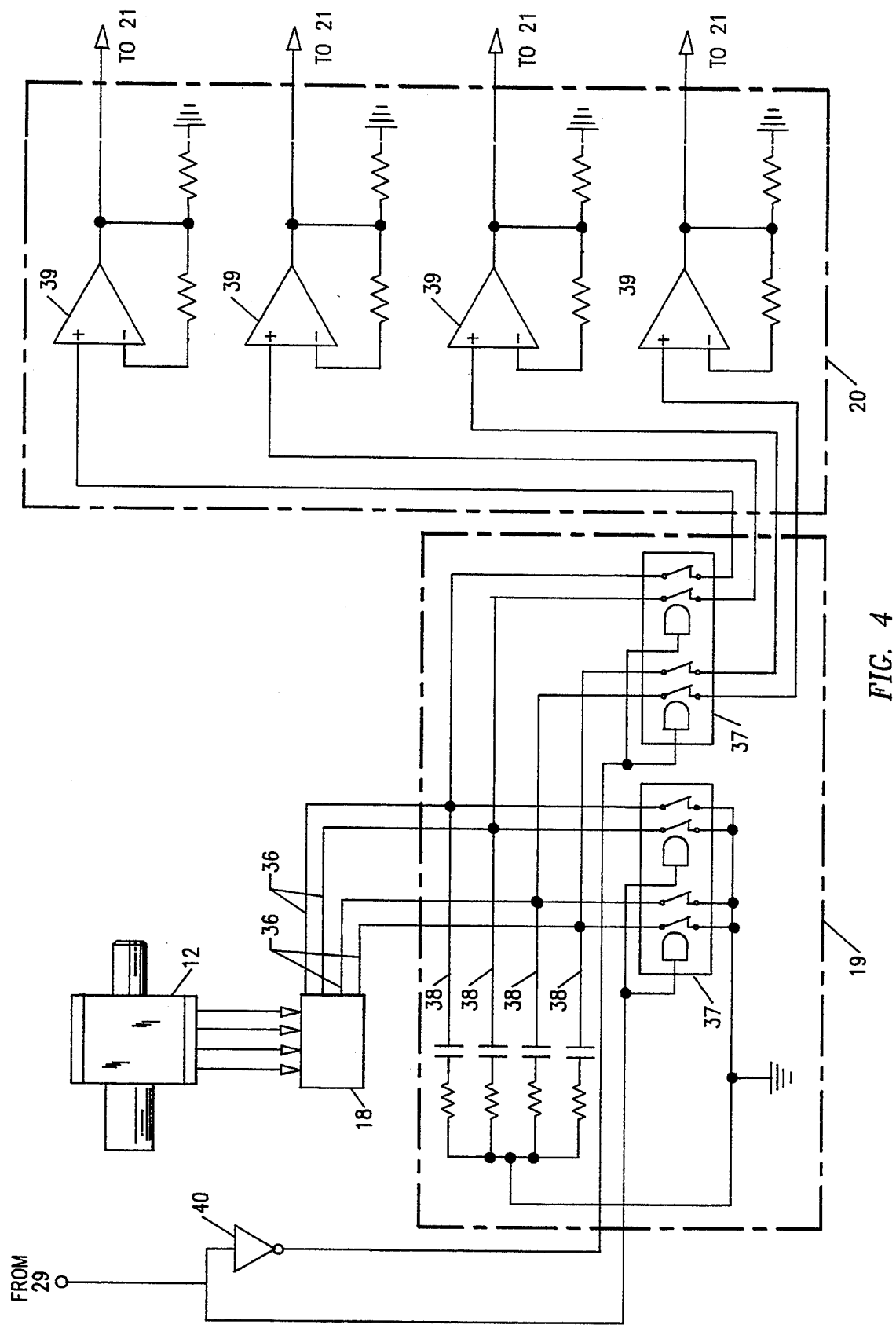
FIG. 4 is an electrical schematic diagram of the analog switch based filter of FIG. 1 which is controlled by the crystal oscillator of FIG. 2 and the four operational amplifiers of FIG. 1.

Referring now to FIG. 4, the four voltage outputs 36 of AC coupled conditioning amplifiers 18 are coupled to the analog switch based filter 19. Amplifiers 18 are conventional op amplifiers. The analog switch filter 19 is comprised of a sample and hold circuit using two 1H5145 Intersil high-level CMOS analog switches 37. Filter 19 is controlled by the 1035.7 Hz output of counter 29 and suppresses all components not locked to 1035.7 Hz. The components of ambient light pulsed at 50 Hz, 60 Hz and/or their harmonics are also present in the output of conditioning amplifiers 18. Integrated for a relatively long period of time (about a second) capacitors 38 of the filter 19 sample and hold circuit, 50 Hz, 60 Hz components are reduced to close to zero. An inverter 40 provides alternate working of two switches 37.

The DC output signals of filter 19, which represent the displacements of the laser pulsed beam on the target 12, are fed to four gain control X/Y operational amplifiers 20. These signals are free of ambient light noise. The four operational amplifiers 20 drive the display unit 21.

While this invention has been described in conjunction with a specific embodiment, it should be apparent for those skilled in the art that many alternatives, modifications, and variations are possible without departing from the spirit thereof. Accordingly, it is intended to embrace all such alternatives, modifications, and variations as may fall within the spirit and broad scope of the claims which are appended hereto.

We claim:

1. A noise resistant laser system for machine alignment, comprising: a semiconductor laser for projecting a narrow collimated beam onto a target; a pulsed power supply for supplying power to said laser at a frequency of $F=nf$, where "F" is the pulse frequency, "f" is a pulse frequency of 50 Hz or 60 Hz, and "n"$=2,3,\ldots$; an oscillator for generating said pulse frequency having an output coupled to said power supply; a target for receiving said laser beam and producing four output signals at said pulse frequency which are indicative of the horizontal and vertical displacements of said laser beam from the center of said target; a filter for passing the components of said four output signals of said target which are indicative of said displacements of said laser beam from the center of said target and suppressing the components of said four target output signals at frequencies of 50 Hz, 60 Hz and their harmonics, said filter having a sample and hold circuit having a pair of inputs, one of said inputs being coupled to an output of said target and the other of said inputs being coupled to said output of said oscillator; and a display unit for processing the output signals of said filter to display said horizontal and vertical displacements of said laser beam in alphanumeric form to enable an operator of said laser system to align a machine.

2. The noise resistant laser system for machine alignment recited in claim 1 wherein said sample and hold circuit is comprised of an analog switch and an RC network coupled to said analog switch.

3. The noise resistant laser system for machine alignment recited in claim 2 wherein said analog switch is a high level CMOS analog switch.

4. The noise resistant laser system for machine alignment recited in claim 1 wherein said oscillator is comprised of a crystal and a counter coupled thereto for producing said pulse frequency.

5. The noise resistant laser system for machine alignment recited in claim 1 wherein said pulse frequency is 1035.7 Hz.

6. The noise resistant laser system for machine alignment recited in claim 1 wherein said target is a lateral effect photodetector target.

7. The noise resistant laser system for machine alignment recited in claim 1 wherein said target is a quadrant type photodetector target.

8. The noise resistant laser system for machine alignment recited in claim 1 wherein said pulsed power supply comprises an interrupter, a laser current control circuit and a synchronous feedback control circuit, said interrupter having an input coupled to said output of said oscillator and an output coupled to said laser current control circuit, said synchronous feedback control circuit having an input and an output, said input being coupled to said output of said oscillator and to an output of said laser, and said output being coupled to said laser current control circuit, and said laser current control circuit having an input coupled to said output of said interrupter and to said output of said synchronous feedback control circuit and an output coupled to an input of said laser.

9. A noise resistant laser system for machine alignment, comprising: a semiconductor laser emitting a narrow collimated light beam onto a target; a photodetector target receiving said light beam from said laser, said target producing four output signals which are indicative of a laser beam spot displacement on said target; a display unit operatively connected to said target for processing said output of said target to enable an operator to perform said alignment; and a noise suppressing means for removing influence of industrial power supplies, lighting and their harmonics on said display unit, said noise suppressing means including: an oscillator for generating a train of pulses at a predetermined frequency distinguishable from industrial power source frequencies and harmonics thereof, a laser power supply fed by said oscillator for pulsing said laser light beam at said predetermined frequency, said laser power supply comprising an interrupter, a laser current control circuit, and a synchronous feedback control circuit, said interrupter being controlled by said oscillator, said synchronous feedback control circuit being fed from said oscillator and from said laser, and said laser current control circuit being fed by said interrupter and said synchronous feedback control circuit and being connected across said laser to govern a said laser emission level and a filter fed by said four target output pulse signals and said oscillator for sorting out components from said target output pulse signals due to said laser light beam, said components being input signals for said display unit.

10. The noise resistant laser system for machine alignment recited in claim 9 wherein said oscillator comprises a crystal stabilized circuit and a counter connected thereto for producing said pulse train at said predetermined frequency.

11. The noise resistant laser system for machine alignment recited in claim 9 wherein said predetermined frequency is 1035.7 Hz.

12. The noise resistant laser system for machine alignment recited in claim 9 wherein said target is a lateral effect photodetector target.

13. The noise resistant laser system for machine alignment recited in claim 9 wherein said target is a quadrant type photodetector target.

14. A noise resistant laser system for machine alignment, comprising: a semiconductor laser emitting a narrow collimated light beam onto a target; a photodetector target receiving said light beam from said laser, said target producing four output signals which are indicative of a laser beam spot displacement on said target; a display unit operatively connected to said target for processing said output of said target to enable an operator to perform said alignment; and a noise suppressing means for removing influence of industrial power supplies, lighting and their harmonics on said display unit, said noise suppressing means including: an oscillator for generating a train of pulses at a predetermined frequency distinguishable from industrial power source frequencies and harmonics thereof, a laser power supply fed by said oscillator for pulsing said laser light beam at said predetermined frequency, and a filter fed by said four target output pulse signals and said oscillator for sorting out components from said target output pulse signals due to said laser light beam, said filter comprising a sample and hold circuit, said components being input signals for said display unit.

15. The noise resistant laser system for machine alignment recited in claim 14 wherein said sample and hold circuit is comprised of an analog switch and an RC network coupled to said analog switch.

16. The noise resistant laser system for machine alignment recited in claim 15 wherein said analog switch is a high level CMOS analog switch.

17. A noise resistant laser system for machine alignment comprising: a semiconductor laser for producing a narrow collimated beam; a photodetector target for receiving the beam and producing four output pulse trains which are indicative of the horizontal and vertical displacements of the laser beam on the target; a crystal controlled oscillator for generating pulses at a frequency which is distinguishable from noise generated by industrial power supplies, lighting and their harmonics; a closed loop control circuit for pulsing the laser at the distinguishable frequency; a sample and hold circuit for sorting out components due to the beam displacement and suppressing components due to industrial power supplies; and a display unit, said closed loop control circuit being comprised of an interrupter, a feedback control circuit and a laser current control circuit, said interruper and the feedback control circuit being controlled by said oscillator, said feedback control circuit being responsive to the emission level of the laser to maintain a constant average emmision level, said display unit processing output signals from said sample and hold circuit to enable an operator to perform the alignment.

* * * * *

UNITED STATES PATENT AND TRADEMARK OFFICE
CERTIFICATE OF CORRECTION

PATENT NO. : 5,353,111

DATED : October 4, 1994

INVENTOR(S) : James W. Freese and Charles D. Stout

It is certified that error appears in the above-identified patent and that said Letters Patent is hereby corrected as shown below:

Column 5, line 41, "F = nf" should be --F $\neq$ nf--

Signed and Sealed this

Twenty-first Day of March, 1995

*Attest:*

BRUCE LEHMAN

*Attesting Officer*     *Commissioner of Patents and Trademarks*